(12) United States Patent
Fugier et al.

(10) Patent No.: US 10,471,775 B2
(45) Date of Patent: *Nov. 12, 2019

(54) TREAD FOR A TIRE

(75) Inventors: Sébastien Fugier, Clermont-Ferrand (FR); Béatrice Lopez, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 695 days.

This patent is subject to a terminal disclaimer.

(21) Appl. No.: 13/992,433

(22) PCT Filed: Dec. 5, 2011

(86) PCT No.: PCT/EP2011/071721
§ 371 (c)(1),
(2), (4) Date: Jul. 18, 2013

(87) PCT Pub. No.: WO2012/076456
PCT Pub. Date: Jun. 14, 2012

(65) Prior Publication Data
US 2013/0299053 A1 Nov. 14, 2013

(30) Foreign Application Priority Data

Dec. 8, 2010 (FR) ..................................... 10 60219

(51) Int. Cl.
*B60C 11/12* (2006.01)
*B60C 11/03* (2006.01)
(Continued)

(52) U.S. Cl.
CPC ........ *B60C 11/0304* (2013.01); *B60C 1/0016* (2013.01); *B60C 11/11* (2013.01);
(Continued)

(58) Field of Classification Search
CPC . B60C 11/0302; B60C 11/0304; B60C 11/12; B60C 11/1236; B60C 2011/129; B60C 2011/1295
See application file for complete search history.

(56) References Cited

U.S. PATENT DOCUMENTS 5,252,649 A 10/1993 Hausmann
5,409,969 A 4/1995 Hamada
(Continued)

FOREIGN PATENT DOCUMENTS

EP 0524164 A1 1/1993
EP 0747466 A1 12/1996
(Continued)

OTHER PUBLICATIONS

English machine translation of JP2009-067344, dated Apr. 2009.*
(Continued)

*Primary Examiner* — Robert C Dye
(74) *Attorney, Agent, or Firm* — Dickinson Wright PLLC (57) ABSTRACT

An asymmetric tread for a snow tire comprising a rubber composition, comprising a tread surface intended to be in contact with the ground when the tire is running, and comprising a sequence of basic patterns arranged in the circumferential direction, each extending over at least 80% of the width (W) of the tread, each comprising a plurality of raised elements provided with sipes opening onto the tread surface, each sipe having a width of less than 1 mm and a depth of at least 3 mm. For each basic pattern, a sipes orientation level (NO) is defined that corresponds to $$\frac{\sum_i |l_i * \alpha_i|}{P * Wm}$$

(Continued)

where i is the number of sipes in the pattern, li is the length of the $i^{th}$ sipe on the tread surface, P is the pitch of the basic pattern, Wm is the width of the basic pattern and αi is the positive or negative angle formed on the tread surface by the $i^{th}$ sipe with the transverse direction, where |αi|≤45 degrees, said orientation level being greater than or equal to 1.5 degrees/mm. The rubber composition comprises at least one diene elastomer, a reinforcing inorganic filler, and a plasticizing system comprising a liquid plasticizing agent being a vegetable oil in a content B of between 10 and 60 phr.

11 Claims, 2 Drawing Sheets

(51) Int. Cl.
    *B60C 1/00*     (2006.01)
    *B60C 11/11*     (2006.01)

(52) U.S. Cl.
    CPC ....... *B60C 11/12* (2013.01); *B60C 2011/1209* (2013.01); *B60C 2011/129* (2013.01)

(56) References Cited

U.S. PATENT DOCUMENTS

| | | | | |
|---|---|---|---|---|
| 5,679,186 | A * | 10/1997 | Tagashira | B60C 11/12 152/209.23 |
| 6,013,718 | A * | 1/2000 | Cabioch et al. | 524/506 |
| 6,071,995 | A | 6/2000 | Labauze | |
| 7,217,751 | B2 | 5/2007 | Durel et al. | |
| 7,246,644 | B2 * | 7/2007 | Colombo et al. | 152/209.18 |
| 7,335,692 | B2 * | 2/2008 | Vasseur et al. | 524/312 |
| 2001/0056045 | A1 | 12/2001 | Lal | |
| 2003/0212185 | A1 | 11/2003 | Vasseur | |
| 2004/0054032 | A1 | 3/2004 | Zanzig et al. | |
| 2004/0127617 | A1 | 7/2004 | Vasseur et al. | |
| 2004/0167705 | A1 | 8/2004 | Lingman et al. | |
| 2004/0211111 | A1 | 10/2004 | Kikuchi | |
| 2005/0016650 | A1 | 1/2005 | Durel et al. | |
| 2005/0016651 | A1 | 1/2005 | Durel et al. | |
| 2005/0148713 | A1 | 7/2005 | Labauze et al. | |
| 2005/0150581 | A1 * | 7/2005 | Kishida | B60C 11/1218 152/209.18 |
| 2005/0209390 | A1 | 9/2005 | Yagi et al. | |
| 2007/0112120 | A1 | 5/2007 | Vasseur | |
| 2007/0293620 | A1 | 12/2007 | Yan et al. | |
| 2010/0184912 | A1 | 7/2010 | Marechal et al. | |
| 2010/0249270 | A1 | 9/2010 | Robert et al. | |
| 2010/0292366 | A1 * | 11/2010 | Herzog et al. | 523/150 |
| 2012/0010355 | A1 | 1/2012 | Yan et al. | |
| 2013/0041096 | A1 | 2/2013 | Yan et al. | |

FOREIGN PATENT DOCUMENTS

| | | |
|---|---|---|
| EP | 0778311 B1 | 1/2000 |
| EP | 0877047 B1 | 10/2002 |
| EP | 1294581 A1 | 3/2003 |
| EP | 1329478 A1 | 7/2003 |
| EP | 1379586 A1 | 1/2004 |
| EP | 1400559 A1 | 3/2004 |
| EP | 1577341 A1 | 9/2005 |
| EP | 1730229 A1 | 12/2006 |
| EP | 1795372 B1 | 7/2012 |
| JP | 62-227908 A | 10/1987 |
| JP | 63-215701 A | 9/1988 |
| JP | 05-319026 * | 12/1993 |
| JP | 2009-153056 * | 6/2007 |
| JP | 2009-067344 * | 4/2009 |
| JP | 2010-208504 * | 9/2010 |
| WO | WO 01/96127 A1 | 12/2001 |
| WO | WO 02/10269 A2 | 2/2002 |
| WO | WO 02/083782 A1 | 10/2002 |
| WO | WO 02/088238 A1 | 11/2002 |
| WO | WO 03/002648 A1 | 1/2003 |
| WO | WO 03/002649 A1 | 1/2003 |
| WO | WO 03/016837 A1 | 2/2003 |
| WO | WO 2004/022644 A1 | 3/2004 |
| WO | WO 2005/087859 A1 | 9/2005 |
| WO | WO 2006/050486 A1 | 5/2006 |
| WO | WO 2008/141702 A1 | 11/2008 |
| WO | WO 2009/000750 A1 | 12/2008 |

OTHER PUBLICATIONS

English machine translation of JP2009-153056, dated Jun. 2007.*
International Search Report (PCT/ISA/210) dated Jan. 18, 2012, by the European Patent Office as the International Searching Authority for International Application No. PCT/EP2011/071721.

* cited by examiner

TREAD FOR A TIRE

FIELD OF THE INVENTION

The present invention relates to a tread for a snow tire and more particularly to a tread for a snow tire with an asymmetric tread pattern design.

PRIOR ART

A tire for winter driving, referred to as a snow tire, must, in a known manner, meet a large number of often conflicting technical requirements, including low rolling resistance, high wear resistance and also good grip on dry ground, on wet ground and on snowy ground.

Snowy ground, referred to as white ground, has the feature of having a low friction coefficient, which leads to the development of snow tires having a specific rubber composition. The grip performance of these tires on wet ground may be, under certain usage conditions, inferior to that of summer tires.

Optimization of the tread in order to find the best compromise between the grip on wet ground and the grip on snowy ground therefore remains a constant concern of tire designers.

Definitions

A "tire" means all types of resilient tires whether or not subjected to an internal pressure when the tire is running.

A "snow tire" (or "winter tire") means a tire identified by an inscription M+S or M.S or else M&S, marked on at least one of the sidewalls of the tire. This snow tire is characterized by a tread design and a structure intended above all to ensure, in mud and fresh snow or slush, a better behaviour than that of a road type tire designed for running on non-snowy ground.

The "tread of a tire" means a quantity of rubber composition delimited by lateral surfaces and by two main surfaces, one of which is intended to come into contact with the ground when the tire is running.

A "tread surface" means the surface formed by the points of the tread of the tire that come into contact with the ground when the tire is running.

An "asymmetric tread" means a tread with a tread pattern design that is not symmetric about a median plane of the tire.

A "basic pattern" means a particular grouping of raised elements. The basic patterns of the tread are derived from one and the same elementary pattern, but may be on different scales.

The "pitch of a basic pattern" means the length of said basic pattern in a circumferential direction X.

A "groove" means a "cut-out" of which the faces of material do not touch under normal running conditions. In general, the width of a groove is greater than or equal to 1 mm.

A "sipe" means a cut-out of which the faces of material touch under normal running conditions. In general, the width of a sipe is less than 1 mm and the depth of the sipe in the tread is greater than or equal to 3 mm.

The dynamic properties $\tan(\delta)$ and $G^*$ characterize the rubber composition. These mechanical properties are measured on a viscosity analyser (Metravib VA4000) according to the standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded during a temperature sweep. The results made use of are the complex dynamic shear modulus $G^*$ measured at 60° C. and the loss factor $\tan(\delta)$ measured at 0° C. at a fixed stress of 0.7 MPa. The value of $\tan(\delta)$ at 0° C. is representative of the potential for grip on wet ground. The value of $G^*$ measured at 60° C. is representative of the stiffness, i.e. the resistance to elastic deformation.

The term "phr" stands for parts by weight per hundred parts of elastomer(s).

A "circumferential direction" means a direction tangential to a circle, the centre of which is on the axis of rotation of the tire.

A "transverse direction" means a direction parallel to the axis of rotation of the tire.

SUMMARY OF THE INVENTION

A first subject of the invention relates to an asymmetric tread for a snow tire comprising a specific tread pattern design and a specific rubber composition. The tread thus comprises a tread surface intended to be in contact with the ground when the tire is running. The tread comprises a sequence of basic patterns arranged in the circumferential direction, each basic pattern extending over at least 80% of the width of the tread. Each basic pattern comprises a plurality of raised elements provided with sipes opening onto the tread surface, each sipe having a width of less than 1 mm and a depth of at least 3 mm. For each basic pattern, a sipes orientation level is defined that corresponds to $$\frac{\sum_i |li * \alpha i|}{P * Wm}$$

where $\alpha i$ is the positive or negative angle formed on the tread surface by the $i^{th}$ sipe with the transverse direction, where $|\alpha i| \le 45$ degrees, said orientation level being greater than or equal to 1.5 degrees/mm$^2$, and the rubber composition comprises at least one diene elastomer, also referred to as first diene elastomer, a reinforcing inorganic filler, and a plasticizing system comprising a liquid plasticizing agent in a content B of between 10 and 60 phr, said liquid plasticizing agent being a vegetable oil.

Tests carried out with tires in accordance with the invention demonstrated that the combination of the rubber composition and of the tread pattern design as defined above improves the compromise between the grip on wet ground and the grip on snowy ground. Moreover, the combination proposed by the invention optimizes the functioning, on wet ground, of the edges formed by the sipes and particularly improves the transverse grip, i.e. curve grip, when the tire is running on this wet ground.

Any extending oil, whether of aromatic or non-aromatic nature, any liquid plasticizing agent known for its plasticizing properties with regard to diene elastomers, can be used. At ambient temperature (23° C.), these plasticizers or these oils, which are more or less viscous, are liquids (that is to say, as a reminder, substances that have the ability to eventually take on the shape of their container), as opposed, in particular, to plasticizing hydrocarbon resins which are by nature solid at ambient temperature.

Liquid plasticizing agents selected from the group consisting of liquid diene polymers, polyolefin oils, naphthenic oils, paraffinic oils, DAE (Distillate Aromatic Extract) oils, MES (Medium Extracted Solvates) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, vegetable oils, ether plasticizers, ester plasticizers, phosphate plasticizers, sulphonate plasticizers and mixtures of these compounds are particularly suitable.

The vegetable oils that can be used as plasticizing agents, in particular in rubber compositions for tires, are well known; they have been described, for example, in patent documents EP 0 524 164, EP 747 466, EP 1 294 581, EP 1 329 478, EP 1 379 586, EP 1 577 341, EP 1 730 229 and WO 2004/022644.

In a known manner, these vegetable oils, in addition to their plasticizing role, make it possible in particular to minimize, in the tread, on the one hand, exudation when running by compression of the total plasticizing system and, on the other hand, the migration of said plasticizer to compounds adjacent to the tread. This results in a compaction and a hardening that are also minimized for the tread and, consequently, in a maintenance of the grip performance over time.

The term "diene" elastomer (or else rubber, the two terms being considered to be synonyms) should be understood to mean, in a known manner, an (one or more are understood) elastomer resulting at least in part (i.e., a homopolymer or a copolymer) from diene monomers (monomers bearing two carbon-carbon double bonds which may or may not be conjugated).

More preferably, use is made of a first diene elastomer selected from the group consisting of polybutadienes (BR) (in particular those having a content of cis-1,4-bonds of greater than 90%), synthetic polyisoprenes (IR), natural rubber (NR), butadiene copolymers, and mixtures of these elastomers. Such copolymers are more preferably selected from the group consisting of butadiene/styrene (SBR) copolymers, and mixtures of such copolymers.

The following are suitable: polybutadienes, in particular those having a content (molar %) of 1,2-units of between 4% and 80% or those having a content (molar %) of cis-1,4- of greater than 80%, polyisoprenes, butadiene/styrene copolymers and in particular those having a Tg (glass transition temperature Tg, measured according to ASTM D3418) of between 0° C. and −80° C., a styrene content of between 5% and 60% by weight and more particularly between 10% and 50%, a content (molar %) of 1,2-bonds of the butadiene part of between 4% and 75% and a content (molar %) of trans-1,4-bonds of between 10% and 80%.

According to one particular embodiment of the invention, the first diene elastomer has a glass transition temperature in a range extending from −80° C. to −35° C., preferably extending from −70° C. to −40° C.

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or microsequential elastomer and may be prepared as a dispersion or in solution.

A preferential feature of the rubber composition of the tread of the snow tire in accordance with the invention is to comprise a first diene elastomer bearing at least one (i.e. one or more) SiOR function, R being hydrogen or a hydrocarbon radical, especially an alkyl, preferably having 1 to 12 carbon atoms, in particular methyl or ethyl.

The expression "hydrocarbon radical" means a monovalent group essentially consisting of carbon and hydrogen atoms, it being possible for such a group to comprise at least one heteroatom, knowing that the assembly formed by the carbon and hydrogen atoms represents the major number fraction in the hydrocarbon radical.

According to one particular embodiment of the invention, the hydrocarbon radical is a branched, linear or else cyclic alkyl having 1 to 12 carbon atoms, more preferably having 1 to 6 carbon atoms, more preferably still having 1 to 4 carbon atoms, in particular a methyl or an ethyl.

According to another particular embodiment of the invention, the radical R is an alkoxyalkyl, more particularly having 2 to 8 carbon atoms.

In the present application, the expression "SiOR function" is used to denote at least one SiOR function, i.e. one or more SiOR functions.

Generally, a function borne by an elastomer may be located on the elastomer chain according to one of three possible configurations: along the elastomer chain as a pendent group, at one end of the elastomer chain or else within the actual elastomer chain (i.e. not at the ends). The latter case especially occurs in the case where the elastomer is functionalized by the use of a coupling or star-branching agent which provides the function in question.

In particular, the SiOR function borne by the first diene elastomer may be located along the elastomer chain as a pendent group, at one end of the elastomer chain or else within the actual elastomer chain. In the case where there are several SiOR functions borne by the elastomer, they may occupy one or other of the configurations above.

The first diene elastomer may be a linear or star-branched, or even branched polymer. If it is a linear polymer, it may or may not be coupled. This elastomer may have a monomodal, bimodal or polymodal molecular distribution.

According to another preferred embodiment of the invention, the first diene elastomer is predominantly in a linear form, that is to say that if it comprises star-branched or branched chains, these represent a minority weight fraction in this elastomer.

According to another particular embodiment of the invention, the first diene elastomer is prepared by anionic polymerization.

According to one particularly preferred embodiment, the first diene elastomer bears at least one (i.e. one or more) function, referred to as a "silanol" function, of formula SiOH (R is hydrogen).

Diene elastomers corresponding to such a definition are well known, they have for example been described in documents EP 0 778 311 B1, WO 2008/141702, WO 2006/050486, EP 0 877 047 B1 or EP 1 400 559 B1. The silanol function SiOH is preferably located as chain end of the diene elastomer, in particular in the form of a dimethylsilanol group —SiMe$_2$SiOH.

According to one particular embodiment of the invention, the silanol function may be bonded to a polysiloxane which constitutes one of the blocks of a block copolymer that also comprises a polydiene block, as described for example in patent EP 0 778 311 B1.

According to another particular embodiment of the invention, the silanol function may be bonded to a polyether constituting one of the blocks of a block copolymer that also comprises a polydiene block, as described for example in application WO 2009/000750.

According to another particularly preferred embodiment, the first diene elastomer bears at least one (i.e. one or more) function of formula SiOR in which R is hydrocarbon radical.

Diene elastomers corresponding to such a definition are also well known, they have for example been described in documents JP 63-215701, JP 62-227908, U.S. Pat. No. 5,409,969 or WO 2006/050486.

According to one particular embodiment, the SiOR function (with R being a hydrocarbon radical), in particular alkoxysilane function, may be bonded to a polyether which constitutes one of the blocks of a block copolymer that also comprises a polydiene block, as described for example in application WO 2009/000750.

According to another particularly preferred embodiment, the first diene elastomer, bearing at least one (i.e. one or more) function of formula SiOR in which R is hydrogen or a hydrocarbon radical, also bears at least one other (i.e. one or more) function that is different from the SiOR function. This other function is preferably selected from the group consisting of epoxy, tin or amine functions, it being possible for the amine to be a primary, secondary or tertiary amine. Amine functions are particularly preferred.

According to another particularly preferred embodiment, which can be applied to each of the embodiments described previously, the first diene elastomer comprises, besides the diene units, vinylaromatic units, in particular styrene units. Preferably, the diene units are butadiene units, preferably combined with styrene units. Advantageously it is a copolymer of styrene and butadiene, SBR, preferably a solution SBR (SSBR).

According to one very particularly preferred embodiment of the invention, the SBR, as first diene elastomer, has a glass transition temperature in a range extending from −80° C. to −35° C., preferably from −70° C. to −40° C.

Thus, according to one advantageous embodiment of the invention, the first diene elastomer is an SBR, preferably an SSBR, bearing at least one silanol function, preferably positioned as chain end.

According to an even more preferred embodiment of the invention, the first diene elastomer is an SBR, preferably an SSBR, bearing a single silanol function, preferably positioned as chain end.

According to another advantageous embodiment of the invention, the first diene elastomer is an SBR, preferably an SSBR, bearing at least one SiOR function (with R being a hydrocarbon radical), in particular alkoxysilane function, and at least one amine function, preferably tertiary amine function, which are preferably both positioned in the chain, and more preferably still within the elastomer chain.

According to an even more preferred embodiment of the invention, the first diene elastomer is an SBR, preferably an SSBR, bearing a single alkoxysilane function and a single amine function, preferably tertiary amine function, which are preferably both positioned in the chain, and more preferably still within the elastomer chain.

It is understood that the first diene elastomer bearing an SiOR function may be formed by a mixture of elastomers that differ from one another by the chemical nature of the SiOR function, by its position on the elastomer chain, by the presence of an additional function other than SiOR, by their microstructure or else by their macrostructure.

The content of the first diene elastomer is preferably in a range extending from 20 to 100 phr, more preferably from 40 to 100 phr, more preferably still from 50 to 100 phr.

When the composition of the tread of the tire in accordance with the invention comprises an optional, second diene elastomer, this elastomer is different from the first diene elastomer insofar as it does not bear an SiOR function. Nevertheless, this second diene elastomer may have a microstructure or a macrostructure that may be identical to or different from those of the first diene elastomer. It is used in a proportion ranging from 0 to 80 phr, preferably from 0 to 60 phr, more preferably still from 0 to 50 phr.

According to one preferred embodiment of the invention, this second diene elastomer is selected from the group consisting of polybutadienes, natural rubber, synthetic polyisoprenes, butadiene copolymers, isoprene copolymers and mixtures of these elastomers.

According to one particular embodiment of the invention, this second diene elastomer is a poly-butadiene. The polybutadiene is preferably a cis-1,4-polybutadiene, i.e. a polybutadiene having a content of cis-1,4-bonds of greater than 90% (molar %), preferably greater than or equal to 96% (molar %).

According to another particular embodiment of the invention, this second diene elastomer is a butadiene copolymer, in particular an SBR, preferably a solution SBR.

According to another particular embodiment of the invention, this second diene elastomer may bear at least one function (other than an SiOR function of course), in particular a tin function. This second elastomer is advantageously a diene elastomer coupled or star-branched to tin.

It is understood that the second diene elastomer may be formed by a mixture of elastomers that differ from one another by their microstructure, by their macrostructure or by the presence of a function, by the nature or the position of the latter on the elastomer chain.

In one preferred embodiment, the reinforcing inorganic filler comprises from 50% to 100% by weight of silica.

Advantageously, the rubber composition comprises from 100 to 160 phr of the reinforcing inorganic filler.

The expression "reinforcing inorganic filler" should be understood here to mean any inorganic or mineral filler, whatever its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known manner, by the presence of hydroxyl (—OH) groups at its surface.

Mineral fillers of the siliceous type, preferably silica ($SiO_2$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 $m^2/g$, preferably from 30 to 400 $m^2/g$, in particular between 60 and 300 $m^2/g$. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in application WO 03/16837.

According to another advantageous embodiment, the rubber composition of the tread of the snow tire in accordance with the invention may comprise carbon black. The carbon black, when it is present, is preferably used at a content of less than 20 phr, more preferably of less than 10 phr (for example between 0.5 and 20 phr, in particular between 2 and 10 phr). In the ranges indicated, the colouring properties (black pigmenting agent) and UV-stabilizing properties of the carbon blacks are benefited from, without, moreover, adversely affecting the typical performances provided by the reinforcing inorganic filler.

In order to couple the reinforcing inorganic filler to the diene elastomer, use is made, in a known manner, of a coupling agent (or bonding agent) intended to provide a satisfactory connection, of chemical and/or physical nature, between the inorganic filler (surface of its particles) and the diene elastomer. This coupling agent is at least bifunctional. Use is made in particular of at least bifunctional organosilanes or polyorganosiloxanes.

Use is made in particular of silane polysulphides, referred to as "symmetrical" or "asymmetrical" depending on their particular structure, as described, for example, in applications WO 03/002648 (or US 2005/016651) and WO 03/002649 (or US 2005/016650).

Particularly suitable, without the definition below being limiting, are silane polysulphides corresponding to the following general formula (I):

$$Z\text{-}A\text{-}S_x\text{-}A\text{-}Z \quad (I)$$

in which:
    x is an integer from 2 to 8 (preferably from 2 to 5);
    the A symbols, which are identical or different, represent a divalent hydrocarbon radical (preferably, a $C_1$-$C_{18}$ alkylene group or a $C_6$-$C_{12}$ arylene group, more particularly a $C_1$-$C_{10}$, especially $C_1$-$C_4$, alkylene, in particular propylene);
    the Z symbols, which are identical or different, correspond to one of the three formulae below:

in which:
    the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
    the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

In the case of a mixture of alkoxysilane polysulphides corresponding to the above formula (I), in particular the standard commercially available mixtures, the mean value of the "x" index is a fractional number preferably between 2 and 5, more preferably close to 4. However, the invention may also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetra-sulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetra-sulphide, as described in the aforementioned patent application WO 02/083782 (or U.S. Pat. No. 7,217,751).

Preferably, combined with the vegetable oil described previously is a hydrocarbon resin at a content preferably between 10 and 60 phr.

Hydrocarbon resins are polymers well known to those skilled in the art, essentially based on carbon and hydrogen but which may comprise other types of atoms, which can be used in particular as plasticizing agents or tackifiers in polymeric matrices. They are by nature miscible (i.e. compatible) in the contents used with the polymer compositions for which they are intended, so as to act as true diluents. They have been described for example in the work entitled "Hydrocarbon Resins" by R. Mildenberg, M. Zander and G. Collin (New York, VCH, 1997, ISBN 3-527-28617-9), Chapter 5 of which is devoted to their applications, especially in rubber tires (5.5. "Rubber Tires and Mechanical Goods"). They may be aliphatic, cycloaliphatic, aromatic, hydrogenated aromatic, of the aliphatic/aromatic type, i.e. based on aliphatic and/or aromatic monomers. They may be natural or synthetic, whether or not based on petroleum (if such is the case, they are also known as petroleum resins). Their Tg is preferably above 0° C., in particular above 20° C. (usually between 30° C. and 95° C.)

In a known manner, these hydrocarbon resins may also be termed thermoplastic resins in the sense that they soften when heated and may thus be moulded. They may also be defined by a softening point or temperature. The softening point of a hydrocarbon resin is generally about 50 to 60° C. higher than its Tg value. The softening point is measured according to standard ISO 4625 (ring-and-ball method). The macrostructure (Mw, Mn and Ip) is determined by size exclusion chromatography (SEC) as indicated below.

To recapitulate, SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/liter. The solution is then filtered through a filter with a porosity of 0.45 μm, before injection into the apparatus. The apparatus used is, for example, a "Waters Alliance" chromatographic line according to the following conditions:
    elution solvent is tetrahydrofuran,
    temperature: 35° C.;
    concentration: 1 g/liter;
    flow rate: 1 ml/min;
    injected volume: 100 μl;
    Moore calibration with polystyrene standards;
    set of 3 "Waters" columns in series ("Styragel HR4E", "Styragel HR1" and "Styragel HR 0.5");
    detection by differential refractometer (for example "WATERS 2410") which may be equipped with operating software (for example "Waters Millenium").

A Moore calibration is carried out with a series of commercial polystyrene standards having a low Ip (less than 1.2), with known molar masses, covering the range of masses to be analysed. The weight-average molar mass (Mw), the number-average molar mass (Mn) and the polydispersity index (Ip=Mw/Mn) are deduced from the data recorded (curve of distribution by mass of the molar masses).

All the values for molar masses shown in the present application are thus relative to calibration curves produced with polystyrene standards.

According to one preferred embodiment of the invention, the hydrocarbon resin exhibits at least any one, more preferably all, of the following characteristics:
- a Tg of above 25° C. (in particular between 30° C. and 100° C.), more preferably above 30° C. (in particular between 30° C. and 95° C.);
- a softening point above 50° C. (in particular between 50° C. and 150° C.);
- a number-average molar mass (Mn) between 400 and 2000 g/mol, preferably between 500 and 1500 g/mol;
- a polydispersity index (Ip) of less than 3, preferably of less than 2 (reminder: Ip=Mw/Mn with Mw the weight-average molar mass).

As examples of such hydrocarbon resins, mention may be made of those selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$-cut homopolymer or copolymer resins, $C_9$-cut homopolymer or copolymer resins, α-methylstyrene homopolymer or copolymer resins and blends of these resins. Among the above copolymer resins, mention may more particularly be made of those selected from the group consisting of (D)CPD/vinylaromatic copolymer resins, (D)CPD/terpene copolymer resins, terpene/phenol copolymer resins, (D)CPD/$C_5$-cut copolymer resins, (D)CPD/$C_9$-cut copolymer resins, terpene/vinylaromatic copolymer resins, terpene/phenol copolymer resins, $C_5$-cut/vinylaromatic copolymer resins and blends of these resins.

The term "terpene" includes here, in a known manner, α-pinene, β-pinene and limonene monomers. It is preferable to use a limonene monomer, a compound which, in a known manner, is in the form of three possible isomers: L-limonene (laevorotatory enantiomer), D-limonene (dextrorotatory enantiomer), or else dipentene, the racemic mixture of the dextrorotatory and laevorotatory enantiomers. Suitable vinylaromatic monomers are for example: styrene, α-methylstyrene, ortho-methylstyrene, meta-methylstyrene and para-methylstyrene, vinyltoluene, para-(tert-butyl)styrene, methoxystyrenes, chlorostyrenes, hydroxystyrenes, vinylmesitylene, divinylbenzene, vinylnaphthalene and any vinylaromatic monomer derived from a $C_9$-cut (or more generally a $C_8$- to $C_{10}$-cut).

More particularly, mention may be made of resins selected from the group consisting of (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins and blends of these resins.

All the above resins are well known to those skilled in the art and are commercially available, for example sold by DRT under the name "Dercolyte" as regards polylimonene resins, sold by Neville Chemical Company under the name "Super Nevtac", by Kolon under the name "Hikorez" or by Exxon Mobil under the name "Escorez" as regards $C_5$-cut/styrene resins or $C_5$-cut/$C_9$-cut resins, or else by Struktol under the name "40 MS" or "40 NS" (blends of aromatic and/or aliphatic resins).

According to one preferred embodiment of the invention, the content A of hydrocarbon resin is between 10 and 50 phr and the content B of liquid plasticizer is between 10 and 50 phr.

According to another preferred embodiment of the invention, the total content A+B of hydrocarbon resin and of liquid plasticizer is between 50 and 100 phr, more preferably is in a range extending from 55 to 90 phr, in particular from 60 to 85 phr.

According to another particular embodiment of the invention, the ratio of A to B is between 1:5 and 5:1 (i.e. between 0.2 and 5.0), preferably between 1:4 and 4:1 (i.e. between 0.25 and 4.0).

According to another particular embodiment of the invention, the weight ratio of (A+B) to the mass of reinforcing inorganic filler, in particular silica, is between 50% and 80%, preferably in a range extending from 55% to 75%.

In a manner known to a person skilled in the art, the designation "resin" is reserved in the present application, by definition, for a compound which is solid at ambient temperature (23° C.), in contrast to a liquid plasticizing compound, such as an oil.

As an example of a vegetable oil, mention may be made of an oil selected from the group consisting of linseed, safflower, soybean, corn, cottonseed, turnip seed, castor, tung, pine, sunflower, palm, olive, coconut, groundnut and grapeseed oils, and mixtures of these oils. The vegetable oil is preferably rich in oleic acid, that is to say that the fatty acid (or all of the fatty acids if several are present) from which it derives comprises oleic acid in a weight fraction at least equal to 60%, more preferably still in a weight fraction at least equal to 70%. As vegetable oil, use is advantageously made of a sunflower oil which is such that all of the fatty acids from which it derives comprise oleic acid in a weight fraction greater than or equal to 60%, preferably 70% and, according to one particularly advantageous embodiment of the invention, in a weight fraction greater than or equal to 80%.

In one preferred embodiment variant, the vegetable oil is a sunflower oil.

The use of sunflower oil as a plasticizer in the composition of the tread according to the invention contributes more to environmental protection, due to the non-polluting nature of such a natural oil.

The rubber compositions of the treads of the tires in accordance with the invention may also comprise all or some of the standard additives customarily used in elastomer compositions intended for the manufacture of treads for tires, especially winter tires, fillers other than those mentioned above, for example non-reinforcing fillers such as chalk, or else platy fillers such as kaolin and talc, pigments, protective agents such as antiozone waxes, chemical antiozonants, antioxidants, reinforcing resins (such as resorcinol or bismaleimide), methylene acceptors (for example phenolic novolac resin) or methylene donors (for example HMT or H3M) as described for example in application WO 02/10269, a crosslinking system based either on sulphur or on sulphur donors and/or on peroxide and/or on bismaleimides, vulcanization accelerators or vulcanization retarders, and vulcanization activators.

The compositions used in the tire treads of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., during which finishing phase the crosslinking system is incorporated.

The process for preparing such compositions comprises, for example, the following stages:
thermomechanically kneading (for example in one or more steps) the diene elastomer(s) with the reinforcing inorganic filler, the coupling agent, where appropriate the carbon black, and the plasticizing system, until a maximum temperature of between 110° C. and 190° C. (referred to as a "non-productive" stage) is reached;

cooling the combined mixture to a temperature below 100° C.;

subsequently incorporating, during a second stage (referred to as a "productive" stage), a crosslinking system;

kneading everything up to a maximum temperature below 110° C.

By way of example, the non-productive phase is carried out in a single thermomechanical stage during which, in a first step, all the base constituents (the diene elastomer(s), the plasticizing system, the reinforcing inorganic filler and the coupling agent) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example, between 40° C. and 100° C.). The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system are various known secondary vulcanization accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and mixtures of these compounds. Preferably, a primary accelerator of the sulphenamide type is used.

The final composition thus obtained may then be calendered, for example in the form of a sheet or a slab, in particular for laboratory characterization, or else extruded, for example to form a rubber profiled element used for manufacturing a winter tire tread.

According to one particular embodiment, the Shore A hardness of the rubber composition according to the invention is in a range extending from 50 to 70, in particular from 55 to 65. The Shore A hardness of the compositions after curing is assessed in accordance with the standard ASTM D 2240-86.

In one embodiment variant, a sipes density is defined that corresponds to $$\frac{\sum_i li}{P * Wm},$$

said sipes density being greater than or equal to 60 μm/mm².

With such a sipes density the grip on snowy ground is particularly improved.

In one embodiment variant, a steering pull criterion (CT) for the basic pattern is defined that corresponds to $$\left| \frac{\sum_i li * \alpha i}{\sum_i |li * \alpha i|} \right|,$$

said steering pull criterion being less than or equal to 0.2.

The inclined sipes form inclined edges on the tread surface of the tread. Dry ground induces significant longitudinal forces on the tread of the tire. Under the effect of these longitudinal forces, part of the inclined edges formed by the sipes generates residual transverse forces which can be transmitted to the vehicle steering device.

By choosing the orientation and length of the sipes in the tread according to the criteria of the invention, it is possible to ensure that the lateral pull effects associated with the sipes compensate for one another, at least in part, at the level of each basic pattern of the tire. In this way, the overall lateral pull of the tire when running on dry ground is limited, while at the same time the grip of this tire on snowy ground is improved.

Preferably, all or some of the raised elements of the basic patterns comprise at least one chamfer, said chamfer belonging to an edge of the raised elements making an angle at most equal to 45° with the transverse direction.

The use of such a chamfer makes it possible to avoid the tearing of the rubber of this edge under high stress, for example during braking on dry ground. The wear of the tread is thus limited.

BRIEF DESCRIPTION OF THE DRAWINGS

Further features and advantages of the invention will become apparent from the following description, given by way of nonlimiting example, with reference to the attached drawings in which.

In the description that is to follow, elements that are identical or similar will be denoted by identical references.

Figure 1:
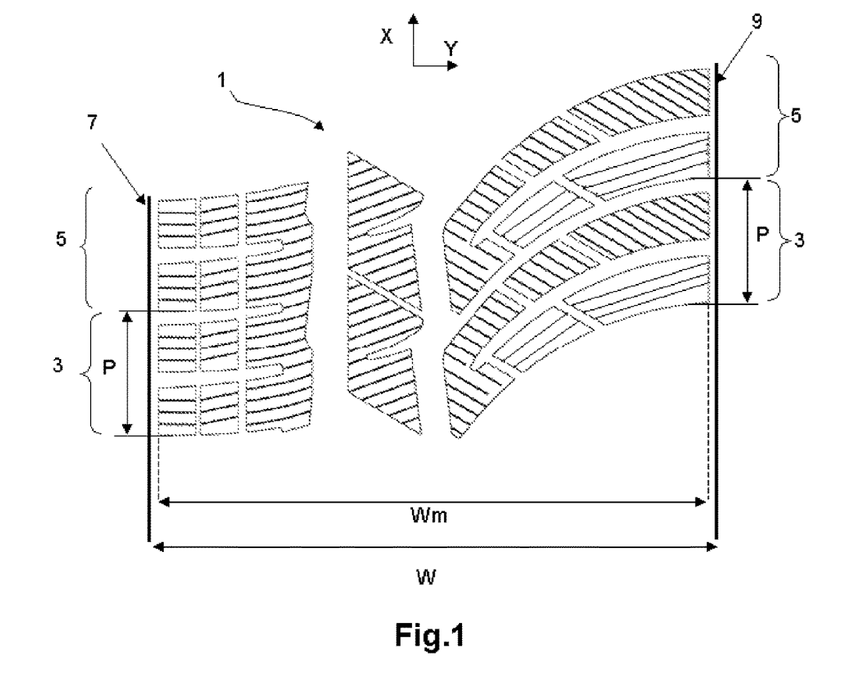
FIG. 1 schematically represents a partial view of a tread of a tire in accordance with the invention.

FIG. 1 partially depicts the tread surface of a tread 1.

The tread 1 comprises a sequence of n basic patterns 3, 5 arranged in the circumferential direction X, where n is a natural integer greater than or equal to 1. To make FIG. 1 easier to understand, only a first basic pattern 3 and a second basic pattern 5 have been represented.

Each basic pattern 3, 5 extends in the circumferential direction X at a determined pitch P.

The pitch of the first basic pattern 3 here is identical to the pitch of the second basic pattern 5. As an alternative, the pitches of the basic patterns are different.

Each basic pattern 3, 5 extends over at least 80% of the width W of the tread. In the example of FIG. 1, the width Wm of the basic pattern 3, 5 here is substantially identical to the width W of the tread.

The width W of the tread corresponds to the distance between a first axial edge 7 and a second axial edge 9 of the tread.

Figure 2:
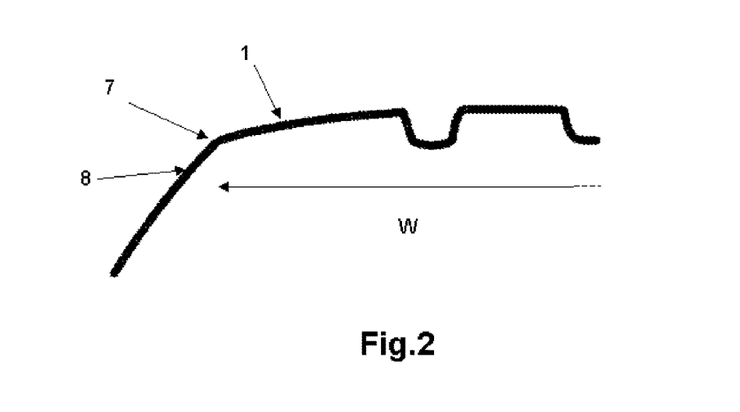
FIG. 2 illustrates how the axial edge of a tread is determined according to a first determination method.
Figure 3:
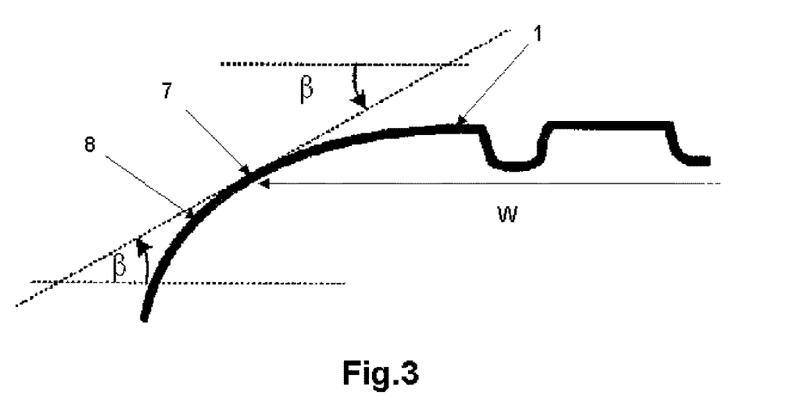
FIG. 3 illustrates how the axial edge of a tread is determined according to a second determination method.

The way in which the width W of a tread is determined is illustrated in FIGS. 2 and 3, each of which show the partial profile of a tread 1 and the part of a sidewall 8 adjacent to it. In certain designs of tire, the transition from the tread to the sidewalls is very clear cut, as in the case represented in FIG. 2, and the first axial edge 7 and the second axial edge (not represented) can be determined intuitively.

However, there are tire designs in which the transition between the tread and the sidewalls is continuous. An example is represented in FIG. 3.

In this FIG. 3, the first axial edge 7 and the second axial edge of the tread are determined as follows. On a radial section through the tire, the tangent to the tread surface at every point on said tread surface in the region of transition toward the sidewall is plotted. The first axial edge 7 is the point at which the angle β (beta) between said tangent and an axial direction is equal to 30°. When there are a number of points for which the angle β between said tangent and an axial direction is equal to 30°, the point adopted is the radially outermost one. The same procedure is followed in order to determine the second axial edge of the tread.

Figure 4:
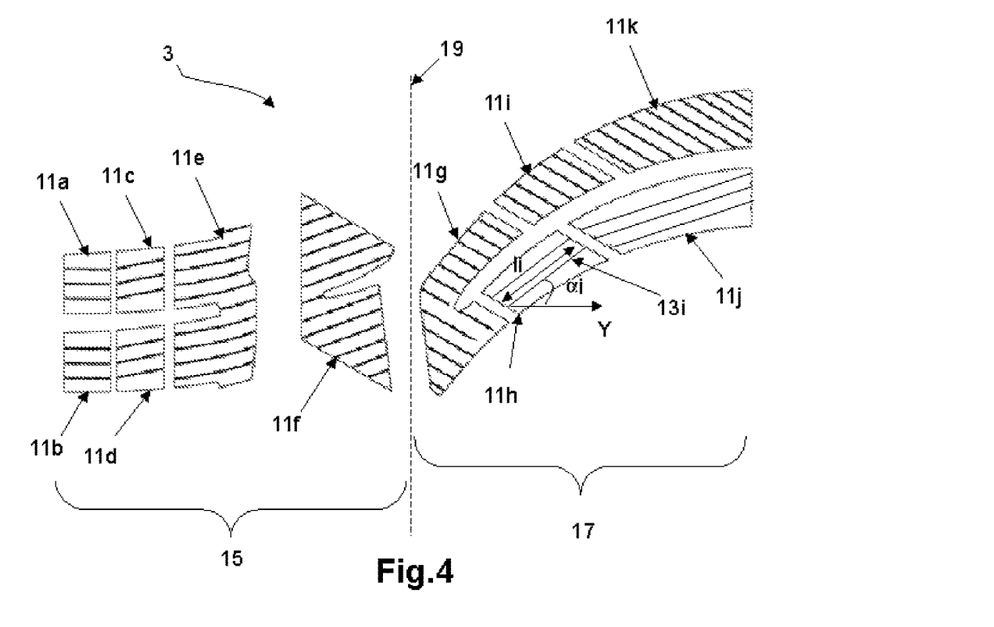
FIG. 4 more specifically represents a basic pattern of the tread of FIG. 1.

FIG. 4 more particularly depicts the first basic pattern 3 of FIG. 1.

The first basic pattern 3 here comprises 11 raised elements, respectively termed the first raised element 11a, second raised element 11b, third raised element 11c, fourth raised element 11d, fifth raised element 11e, sixth raised element 11f, seventh raised element 11g, eighth raised element 11h, ninth raised element 11i, tenth raised element 11j, eleventh raised element 11k.

The first basic pattern 3 is provided with i sipes 13i opening onto the tread surface, where i is a natural integer greater than 1.

The i sipes are distributed across the various raised elements 11a-11k.

For each sipe 13i it is possible to determine a sipe length li corresponding to the length of the line of said sipe on the tread surface.

An angle αi (alpha i) is also determined for each sipe 13i, where $|\alpha i| \leq 45$ degrees. The angle αi corresponds to the angle formed by the $i^{th}$ sipe 13i with the transverse direction Y.

The way in which the angles of the sipes are defined is explained later on in the description.

The sipe angle is said to be positive with respect to the transverse direction Y if the rotation that brings said transverse direction Y onto the line of the sipe on the tread surface is in the counterclockwise direction.

Conversely, the sipe angle is said to be negative with respect to the transverse direction Y if the rotation that brings said transverse direction Y onto the line of the sipe on the tread surface is in the clockwise direction.

Thus, the first element 11a and the second element 11b have sipes that form an angle that is zero overall with the transverse direction Y.

Likewise, the third element 11c, the fourth element 11d, the fifth element 11e, the sixth element 11f, the eighth element 11h and the tenth element 11j have sipes that form a positive angle with the transverse direction Y.

Finally, the seventh element 11g, the ninth element 11i and the eleventh element 11k have sipes that form a negative angle with the transverse direction Y.

The sipes belonging to one and the same raised element are oriented here with the same angle.

As a variant, it is possible to have sipes of different orientation in one and the same raised element.

A sipes density D, a sipes orientation level NO and a steering pull criterion CT are also defined for the basic pattern 3.

The sipes density D corresponds to the equation $$\frac{\sum_i li}{P * Wm}.$$

Remember that i is the number of sipes in the basic pattern, li is the length of the $i^{th}$ sipe on the tread surface, P is the pitch of the basic pattern and Wm is the width of the basic pattern.

The sipes orientation level NO corresponds to the equation $$\frac{\sum_i |li * \alpha i|}{P * Wm}.$$

Remember that αi is the positive or negative angle formed on the tread surface by the $i^{th}$ sipe with the transverse direction Y and $|\alpha i| \leq 45$ degrees.

The steering pull criterion CT for the basic pattern corresponds to the equation $$\left| \frac{\sum_i li * \alpha i}{\sum_i |li * \alpha i|} \right|.$$

The number of sipes 13i in the basic pattern 3, the length of the sipes and the angle of the sipes are determined so that the sipes density is greater than or equal to 60 μm/mm², the sipes orientation level is greater than or equal to 1.5 degrees/mm and the steering pull criterion for the pattern is less than or equal to 0.2.

In this way a low degree of lateral pull of the tire when running on dry ground is guaranteed, while at the same time maintaining a good level of grip for this tire on snowy ground.

Advantageously, the steering pull criterion for the pattern is less than 0.1.

In another variant, the steering pull criterion for the pattern is less than 0.05.

By way of example, the characteristics of the sipes present in the various raised elements of FIG. 4 have been listed in the table below. In this table, the first row references the various raised elements of the basic pattern 3, the second row details the angles of the sipes associated with the various raised elements, and the third row details the total length of the sipes present in the various raised elements.

| | Raised elements | | | | | | | | | | |
|---|---|---|---|---|---|---|---|---|---|---|---|
| | 11a | 11b | 11c | 11d | 11e | 11f | 11g | 11h | 11i | 11j | 11k |
| Angle of the sipes in degrees | 0 | 0 | 4.5 | 4.5 | 12 | 20 | −30 | 35 | −30 | 18 | −30 |
| Total length of sipes (mm) | 50 | 50 | 50 | 50 | 250 | 245 | 170 | 70 | 90 | 160 | 220 |

By adopting a basic pattern pitch of the order of 50 mm and a pattern width Wm of 230 mm, a sipes density D of the order of 122 μm/mm², an orientation level NO of 2.44 degrees/mm, and a steering pull criterion CT of 0.025 can be calculated.

It will be noted here that the shape of the raised elements 11a-11k and their arrangement on the tread are determined in such a way that the tread pattern design thus formed is asymmetric. The tire therefore has a predetermined direction of fitting so that one sidewall of the tire is always on the outside of the vehicle irrespective of where (right or left) on the vehicle it is mounted. These tires generally bear a marking ("outside" or "inside") indicating to the user which sidewall of the tire has to face towards the outside of the vehicle, which hereinafter will be termed the outboard sidewall, and which sidewall of the vehicle has to face towards the inside of the vehicle, hereinafter termed the inboard sidewall. According to the markings on the tire, it is possible to determine in FIG. 4 an inboard half-tread 17 and an outboard half-tread 15. Specifically, the inboard half-tread is the half-tread adjacent to the inboard sidewall and the outboard half-tread is the half-tread adjacent to the outboard sidewall. It will be noticed that a median plane 19 separates the inboard half-tread 17 from the outboard half-tread 15.

In FIG. 4, the inboard half-tread comprises the seventh element 11g, the eighth element 11h, the ninth element 11i, the tenth element 11j, the eleventh element 11k. Likewise, the outboard half-tread comprises the first element 11a, the second element 11b, the third element 11c, the fourth element 11d, the fifth element 11e and the sixth element 11f.

It will be noted that the inboard half-tread plays an important role in the functioning of the tire because this is the part of the tread that is most heavily involved in ensuring grip on snowy ground, particularly during cornering. Thus, in order to improve this cornering grip, the sipes of the inboard half-tread are inclined more steeply with respect to the transverse direction. In particular, measures are taken to ensure that the orientation level NO of the sipes on the raised elements 11g-11k are greater than 2 degrees/mm. In the example of the table described hereinabove, and considering an inboard half-tread width of Wm/2, an orientation level of these sipes of the order of 3.43 degrees/mm is thus determined.

In one embodiment variant, all or some of the raised elements of the basic patterns comprise at least one chamfer, said chamfer belonging to an edge of the raised elements making an angle at most equal to 45° with the transverse direction.

Table 1 below describes the nature of a conventional composition C1 that can be used to form a winter tire tread, based on polybutadiene and SBR copolymer (SBR1).

In this control composition, the two elastomers used are in particular free of SiOR; the content of reinforcing inorganic filler is less than 100 phr, and the content A+B of plasticizing system is less than 50 phr, formed of polylimonene plasticizing resin (20 phr), sunflower vegetable oil (15 phr) and MES oil (5 phr) as liquid plasticizing system.

The composition C2, in accordance with the invention, is characterized by the presence of at least 20 phr of a diene elastomer bearing a silanol function, at least 100 phr of a reinforcing inorganic filler, more than 50 phr of a plasticizing system formed of plasticizing resin (polylimonene) and of liquid plasticizing system (sunflower vegetable oil) at contents respectively between 10 and 60 phr. The elastomer SBR2 of composition C2 contains a mixture of 85% of an SBR bearing a dimethylsilanol function at a chain end and 15% of SBR star-branched to tin and having the same microstructure.

TABLE 1

| | Composition No. | |
|---|---|---|
| | C1 | C2 |
| BR (1) | 40 | — |
| IR (2) | — | 50 |
| SBR1 (3) | 60 | — |
| SBR2 (4) | — | 50 |
| Carbon black (5) | 5 | 5 |
| Silica (6) | 90 | 115 |
| Coupling agent (7) | 7.2 | 9.2 |
| Liquid plasticizer (8) | 5 | — |
| Liquid plasticizer (9) | 15 | 40 |
| Resin (10) | 20 | 35 |
| Total plasticizer | 40 | 75 |
| Stearic acid | 3 | 3 |
| Antiozone wax | 1.5 | 1.5 |
| Antioxidant (11) | 2 | 2 |
| DPG (12) | 2.1 | 2.1 |
| ZnO | 1.2 | 1.2 |
| Accelerator (13) | 1.6 | 1.6 |
| Sulphur | 1.4 | 1.4 |

(1) BR with 4% of 1,2-units and 93% of cis-1,4-(Tg = −106° C.);
(2) synthetic polyisoprene ("SKI-3S" sold by Nizhnekamsk);
(3) SBR1: SBR with 27% of styrene units and 57% of 1,2-units of the butadiene part (Tg = −24° C.);
(4) SBR2: SBR (Sn star-branched) with 27% of styrene units and 24% of 1,2-units of the butadiene part bearing a silanol function as end of the elastomer chain (Tg = −48° C.);
(5) ASTM N234 grade (Cabot);
(6) "Zeosil 1165 MP" silica from Rhodia of HDS type;
(7) TESPT ("Si69" from Degussa);
(8) MES oil ("Catenex SNR" from Shell);
(9) Sunflower oil containing 85% by weight of oleic acid, "Lubrirob Tod 1880" from Novance;
(10) C5/C9 resin ("Escorez ECR-373" from Exxon);
(11) N-(1,3-dimethylbutyl)-N'-phenyl-p-phenylenediamine, from Flexsys;
(12) Diphenylguanidine ("Perkacit" DPG from Flexsys);
(13) N-dicyclohexyl-2-benzothiazole sulphenamide ("Santocure CBS" from Flexsys).

These two compositions were extruded in the forme of a tread in order to then be tested.

Compositions C1 and C2 are used as treads for conventionally manufactured radial carcass passenger vehicle winter tires, denoted respectively P1 (control tire) and P2 (tire in accordance with the invention), having dimensions 225/45 R17. The control tire P1 is a commercial snow tire of conventional tread pattern design. Tire P2 has a tread pattern design in accordance with the invention. Tires P1 and P2 thus differ by their rubber composition and their tread pattern design.

Tires P1 and P2 were then subjected to straight-line braking tests on wet ground and on snowy ground.

In order to test the braking on wet ground, the tires were fitted to a motor vehicle of Audi make and A4 model, equipped with an ABS braking system and the distance needed to go from 80 km/h to 10 km/h was measured during sudden braking on sprayed ground (bituminous concrete).

In order to test the braking on snowy ground, the tires were fitted to a motor vehicle of Volkswagen make and Golf model, equipped with an ABS braking system and the distance needed to go from 50 km/h to 5 km/h was measured during emergency braking on snow.

It is observed that the snow tire in accordance with the invention P2 has grip on wet ground that is improved by around 5% compared to the control tire P1. It is also noted that this result is obtained without being at the expense of the performance on snowy ground. On the contrary, the snow tire P2 has grip on snowy ground that is improved by around 4% compared to the control tire P1.

Additional braking tests were carried out on a winding circuit under wet conditions. It was observed that the snow tire P2 also has improved transverse grip on wet ground, that is to say curve grip, compared to the control tire P1.

The invention claimed is:

1. An asymmetric tread for a snow tire comprising a rubber composition which comprises:
   at least one diene elastomer,
   a reinforcing inorganic filler, and
   a plasticizing system comprising a liquid plasticizing agent in a content B of between 10 and 60 phr, said liquid plasticizing agent being a vegetable oil,
   wherein the tread comprises: a tread surface intended to be in contact with the ground when the tire is running,
   a sequence of basic patterns arranged in a circumferential direction (X), wherein each basic pattern has a width (Wm) that extends in a transverse direction over at least 80% of the width (W) of the tread, each basic pattern has a pitch (P) extending a distance in the circumferential direction, and each basic pattern comprises a plurality of raised elements, one or more of which are provided with sipes opening onto the tread surface, wherein each sipe has a width of less than 1 mm and a depth of at least 3 mm,
   wherein, for each basic pattern, a sipes orientation level (NO) is defined that corresponds to $$\frac{\sum_i |li * \alpha i|}{P * Wm}$$

where i is the number of sipes in the pattern, li is the length of the $i^{th}$ sipe on the tread surface, P is the pitch of the basic pattern, Wm is the width of the basic pattern and $\alpha i$ is the positive or negative angle formed on the tread surface by the $i^{th}$ sipe with the transverse direction, where $|\alpha i| \leq 45$ degrees, said sipes orientation level being greater than or equal to 1.5 degrees/mm, and
   wherein the tread comprises a median dividing the tread into an inboard portion and an outboard portion, and the plurality of the raised elements on the inboard portion are provided with sipes at a steeper angle relative to the transverse direction than the plurality of the raised elements on the outboard portion, and the sipe orientation level for all the plurality of the raised elements in the inboard portion is greater than 2.

2. The tread according to claim 1, wherein said rubber composition comprises 20 to 100 phr of a diene elastomer bearing at least one SiOR function, R being hydrogen or a hydrocarbon radical.

3. The tread according to claim 1, wherein the reinforcing inorganic filler comprises from 50% to 100% by weight of silica.

4. The tread according to claim 1, wherein said rubber composition comprises 100 to 160 phr of said reinforcing inorganic filler.

5. The tread according to claim 1, wherein the plasticizing system further comprises a hydrocarbon resin in a content A of between 10 and 60 phr.

6. The tread according to claim 5, wherein the total content A+B is greater than 50 phr.

7. The tread according to claim 1, wherein the vegetable oil is a sunflower oil.

8. The tread according to claim 1, wherein the tread has a sipes density (D) defined as $$\frac{\sum_i li}{P * Wm},$$

said sipes density (D) being greater than or equal to 60 µm/mm².

9. The tread according to claim 1, wherein the tread has a steering pull criterion (CT) for the basic pattern defined as $$\left| \frac{\sum_i li * \alpha i}{\sum_i |li * \alpha i|} \right|,$$

said steering pull criterion being less than or equal to 0.2.

10. The tread according to claim 1, wherein all or some of the raised elements of the basic patterns comprise at least one chamfer, said chamfer belonging to an edge of the raised elements making an angle at most equal to 45° with the transverse direction.

11. A snow tire comprising a tread according to claim 1.

* * * * *